United States Patent [19]
Geyer

[11] Patent Number: 5,932,978
[45] Date of Patent: Aug. 3, 1999

[54] SMOKE GENERATOR FOR RADIO CONTROLLED AIRCRAFT

[76] Inventor: John M. Geyer, 4724 Harvest La., El Paso, Tex. 79924

[21] Appl. No.: 09/066,698

[22] Filed: Apr. 27, 1998

[51] Int. Cl.$^6$ .............................. H02P 7/10; G09F 21/16
[52] U.S. Cl. .............................. 318/16; 318/581; 40/213; 244/190
[58] Field of Search ............................ 40/213; 244/75 R, 244/76 R, 189, 190, 118.1, 118.2; 318/16, 580, 581

[56] References Cited

U.S. PATENT DOCUMENTS

| | | | |
|---|---|---|---|
| 1,364,152 | 1/1921 | Steinmetz | 244/136 |
| 1,716,794 | 6/1929 | Remey | 40/213 |
| 2,062,510 | 12/1936 | Haddock et al. | 40/213 |
| 2,062,511 | 12/1936 | Haddock et al. | 244/136 |
| 2,065,024 | 12/1936 | Remey | 40/213 |
| 2,308,060 | 1/1943 | Rochefort-Lucay | 40/213 |
| 2,345,152 | 3/1944 | Remey | 40/213 |
| 2,401,873 | 6/1946 | Kendrick | 244/1 R |
| 2,404,812 | 7/1946 | Rankin | 40/213 |
| 2,409,471 | 10/1946 | Brosseit | 446/24 |
| 2,608,025 | 8/1952 | Miller | 446/30 |
| 3,089,271 | 5/1963 | Copeland | 40/213 |
| 3,272,510 | 9/1966 | Ohlund et al. | 273/372 |
| 4,122,618 | 10/1978 | Gay | 40/213 |
| 4,443,014 | 4/1984 | Kovit et al. | 273/363 |
| 4,561,201 | 12/1985 | Sanborn | 40/213 |
| 4,836,452 | 6/1989 | Fox | 239/338 |
| 4,964,331 | 10/1990 | Halevy et al. | 89/37.19 |

FOREIGN PATENT DOCUMENTS

| | | |
|---|---|---|
| 191420 | 1/1923 | United Kingdom . |
| 582930 | 7/1946 | United Kingdom . |

*Primary Examiner*—Brian Sircus
*Attorney, Agent, or Firm*—Stephen R. Greiner

[57] ABSTRACT

A smoke generator for radio controlled aircraft having an internal combustion engine. The smoke generator includes a bracket for attachment to the radio controlled aircraft and a cradle releasably secured to the bracket. A container, a valve assembly, and a servo are all carried by the cradle. The container holds a pressurized, smoke-generating liquid and is placed in fluid communication with the internal combustion engine by a conduit. The valve assembly regulates the flow of pressurized, smoke-generating liquid from the container into the conduit. The servo has a motor-driven crank for operating the valve assembly in response to radio signals received from a remote transmitter.

20 Claims, 3 Drawing Sheets

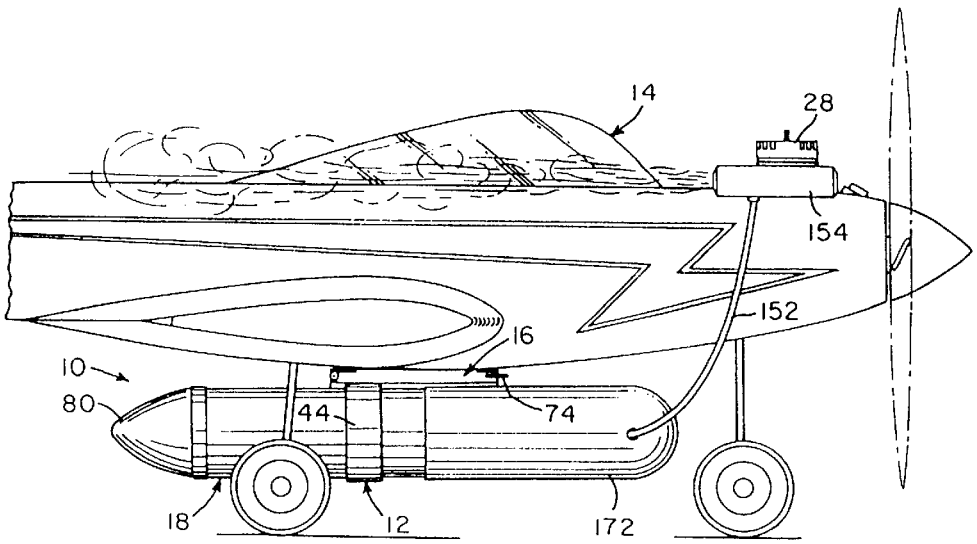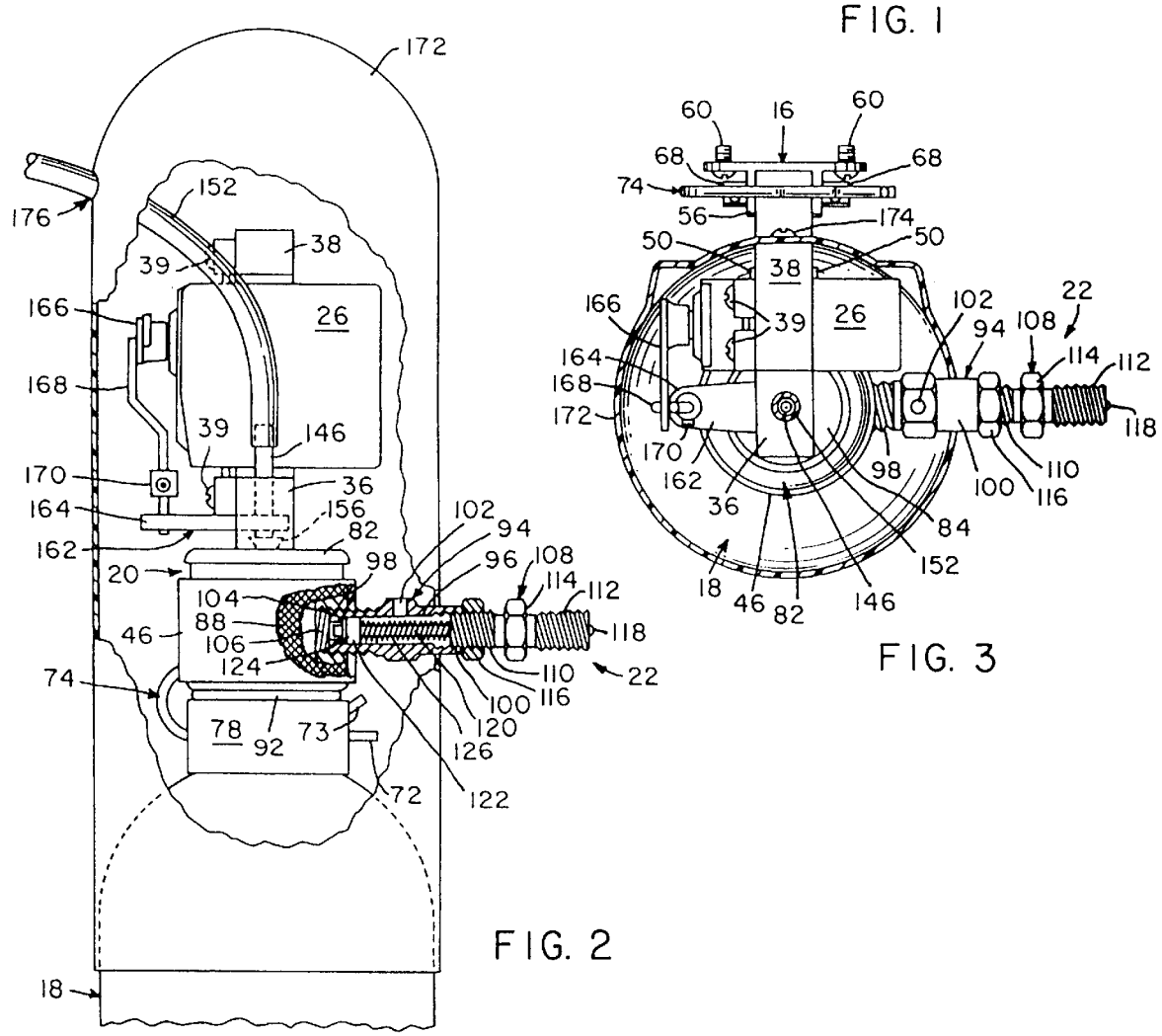
FIG. 1
FIG. 2
FIG. 3

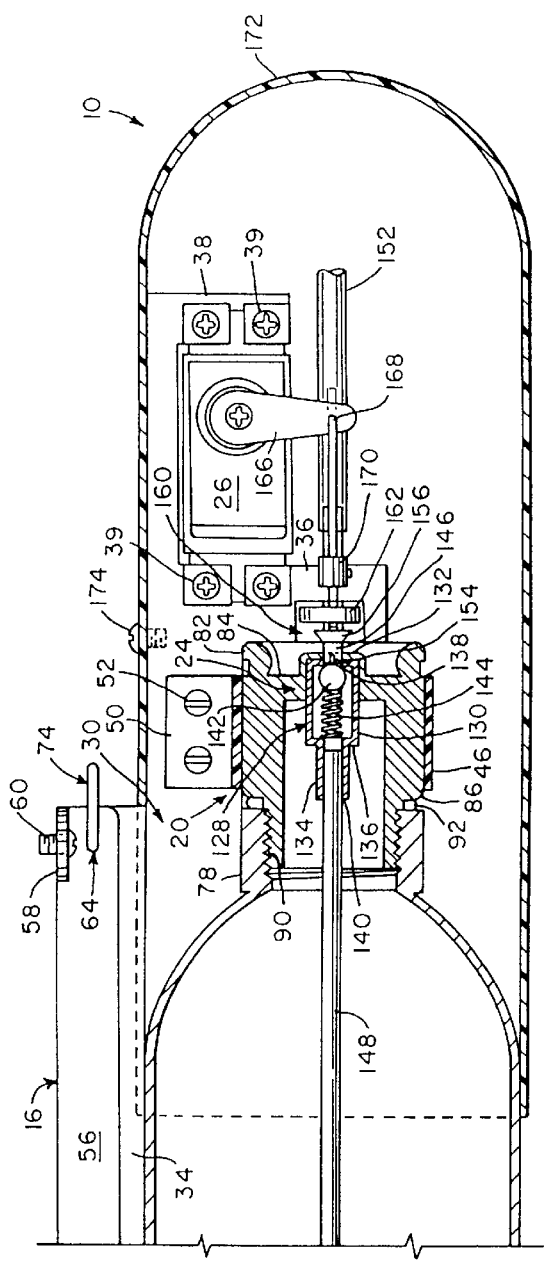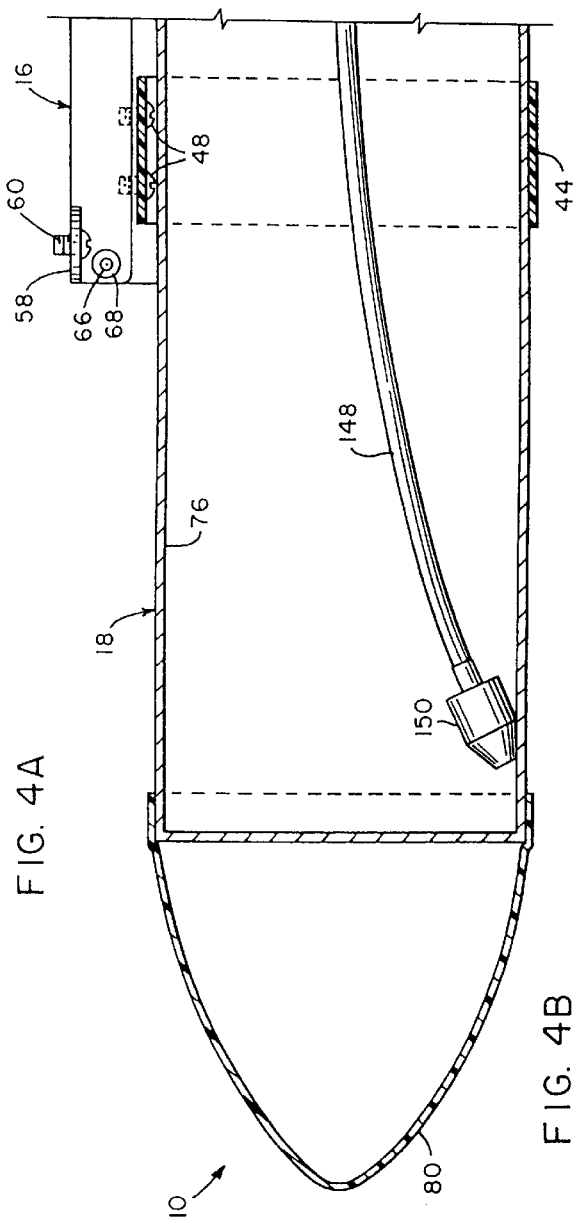
FIG. 4A
FIG. 4B

SMOKE GENERATOR FOR RADIO CONTROLLED AIRCRAFT

FIELD OF THE INVENTION

The present invention relates generally to aeronautics and, more particularly, to aircraft structures for material discharging and diffusing.

BACKGROUND OF THE INVENTION

Smoke generating systems for radio controlled aircraft have been developed in the past. These systems typically involve the installation of equipment, such as a pump and a storage tank, within the aircraft. Equipment size and weight constraints limit the use of such systems to only the largest aircraft which are the most expensive to build and fly. Moreover, because these systems are not easily removed from an aircraft after installation, the purchase of multiple systems is required if the concurrent ownership of more than one aircraft with skywriting capabilities is desired by a hobbyist. A need, therefore, exists for a compact smoke generator which can be easily moved among two or more aircraft by a hobbyist.

SUMMARY OF THE INVENTION

In light of the problems associated with the known smoke generating systems, it is a principal object of the invention to provide a smoke generator that is self-contained and can be easily installed upon virtually any radio controlled aircraft powered by an internal combustion engine. The smoke generator in accordance with the invention is preferably externally mounted so that it can be used with relatively small aircraft having minimal internal space which would not accommodate a typical smoke generating system.

It is another object of the invention to provide a smoke generator of the type described that can be easily exchanged between aircraft in the field without special tools.

It is a further object of the invention to provide a smoke generator that requires no complicated plumbing which may leak within an aircraft.

Still another object of the invention is to provide a smoke generator which does not rely on engine back-pressure or an aircraft-carried pump for the discharge of smoke-generating substances into the atmosphere.

At is another object of the invention to provide a smoke generator that is reusable and easily recharged after use.

It is an object of the invention to provide improved elements and arrangements thereof in a smoke generator for the purposes described which is lightweight in construction, inexpensive in manufacture, and fully dependable in use.

Briefly, the smoke generator in accordance with this invention achieves the intended objects by featuring a bracket for attachment to a radio controlled aircraft powered by an internal combustion engine and a cradle releasably secured to the bracket. Carried by the cradle are: a container, a valve assembly, and a servo. The container holds a pressurized, smoke-generating liquid and is placed in fluid communication with the engine by a conduit. The valve assembly regulates the flow of pressurized, smoke-generating liquid from the container into the conduit. The servo has a motor-driven crank for operating the valve assembly in response to radio signals received from a ground-based transmitter. Smoke-generating liquid delivered to the hot engine is vaporized to generate a plume of smoke which may be used for skywriting purposes.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a side view of a smoke generator in accordance with the present invention secured to the undersurface of a radio controlled aircraft and ready for flight.

FIG. 2 is a bottom view of the front part of the smoke generator of FIG. 1 with portions broken away to reveal details thereof.

FIG. 3 is a front view of the smoke generator with portions broken away.

FIG. 4A is a side view of the front part of the smoke generator with portions broken away.

FIG. 4B is a side view of the rear part of the smoke generator with portions broken away.

Similar reference characters denote corresponding features consistently throughout the accompanying drawings.

DETAILED DESCRIPTION OF THE PREFERRED EMBODIMENT

Figure 5:
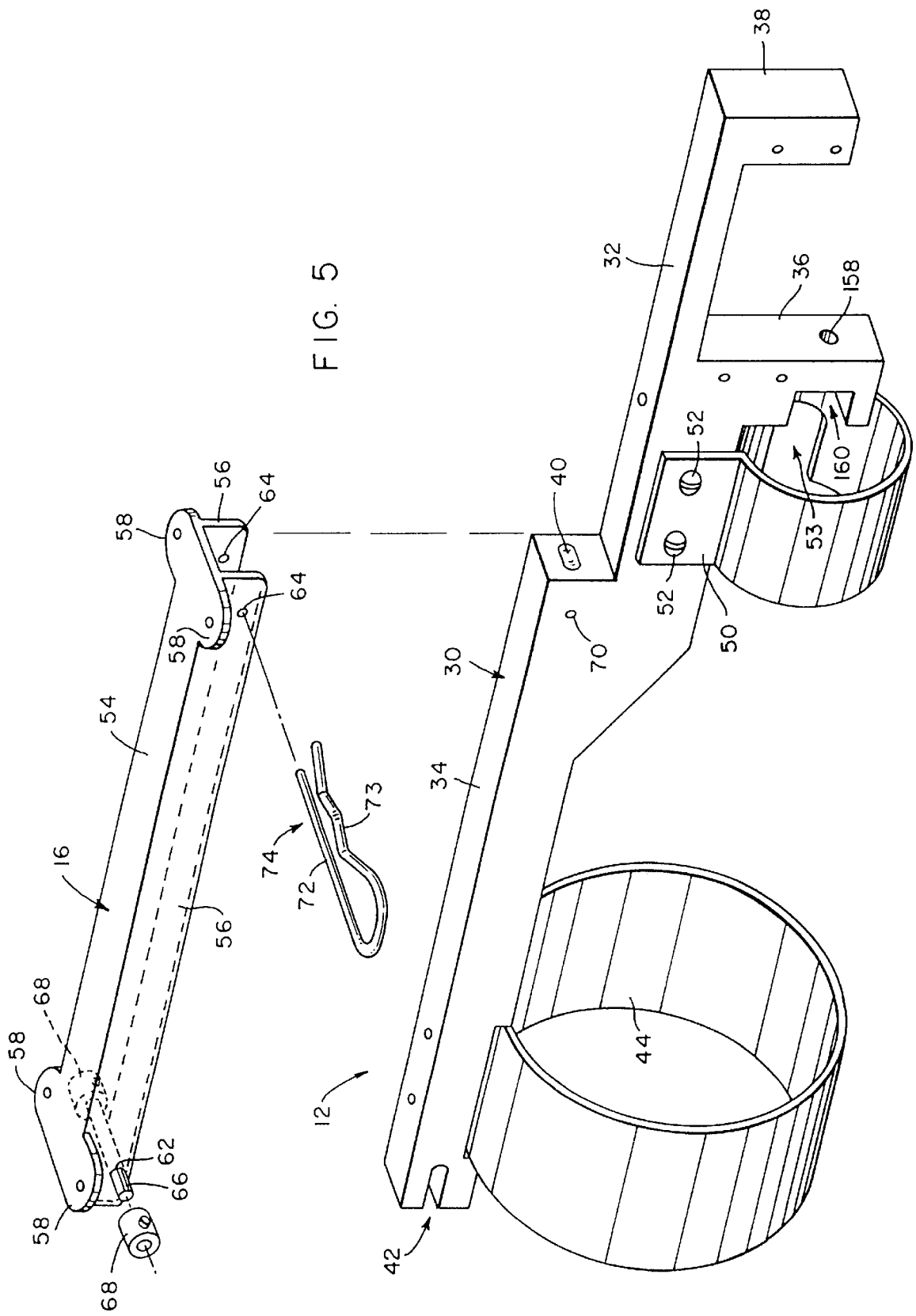
FIG. 5 is a perspective view of the mounting system of the smoke generator.

Referring now to FIGS., a smoke generator in accordance with the present invention is shown generally at 10. The smoke generator 10 includes a cradle 12 which may be releasably attached to a radio controlled aircraft 14 by means of a bracket 16. Secured within the cradle 12 is a container 18 adapted to hold a pressurized, smoke-generating liquid. The container 18 is capped by a valve assembly 20 with separate inlet and outlet valves 22 and 24 respectively. In use, the outlet valve 24 is opened by a cradle-carried servo 26 to deliver smoke-generating liquid to the aircraft engine 28 for skywriting purposes.

The cradle 12 includes a keel member 30 molded as a single unit from plastic. The keel member 30 has forward and rearward portions 32 and 34 which diverge from one another and are vertically offset so that the forward portion is relatively lower than the rearward portion. The forward portion 32 is provided with a pair of downwardly extending legs 36 and 38 between which the servo is attached with screws 39. The rearward portion 34, on the other hand, has an indention 40 at its front end and a horizontal slot 42 bisecting its rear end.

Secured to the keel member 30, to complete the cradle 12, are a pair of ring members 44 and 46. The rearward ring member 44 is sized to loosely receive the container 18 and the forward ring member 46 is sized to securely clamp the valve assembly 20. Preferably, the rearward ring member 44 is formed as an endless loop and is secured to the bottom of the rearward portion 34 of the keel 30 by screws 48. The forward ring member 46, having a rearwardly opening slot 53, is transversely split and has retaining flanges 50 on opposite sides of the split which permit attachment by screws 52 to the opposite sides of the forward portion 32 between the leg 36 and rearward ring member 44.

The bracket 16 is formed of plastic or metal and has a cross section resembling an inverted "U". The bracket 16 has a top wall 54 and a pair of parallel side walls 56 extending downwardly from the top wall. A pair of apertured mounting tabs 58 extend outwardly from each of the side walls 56 for attachment of the bracket 16 by screws 60 to the aircraft 14.

Two pairs of axially aligned apertures 62 and 64 are provided in the side walls 56 of the bracket 16. Apertures 62 are positioned at the rear end of the bracket 16 and accommodate a transverse rod 66 which is held in the apertures 62 by set screw-retained collars 68. Apertures 64, however, are adapted for axial alignment with an aperture 70 in the rearward portion 34 of the keel member 30 for the passage of one leg 72 of a retaining clip 74.

The container 18 is formed of aluminum or any other suitable material. Preferably, the container 18 has an elongated, cylindrical body 76, sized to hold about five hundred milliliters of smoke-generating liquid, with a tapered, internally-threaded neck 78 at its front end. The rear end of the container 18, being flat in the preferred embodiment of the smoke generator 10, is fitted with a conical fairing 80 made of lightweight plastic. The fairing 80 is glued to the exterior of the container body 76 to smooth its outline and thus reduce drag.

The valve assembly 20 includes a hollow cap 82 preferably formed of aluminum. The cap 82 includes a circular front wall 84 and a cylindrical side wall 86 extending rearwardly from the front wall. The front end of the side wall 86 is knurled as shown at 88 to grip the interior of the forward ring member 46. The rear end of the side wall 86 is provided with threads 90 for threaded attachment within the neck 78 of the container 18.

A rubber O-ring 92 is positioned around the side wall 86 adjacent the threads 90 to ensure a good seal between the cap 82 and the container 18.

The inlet valve 22 permits air to be pumped into the container 18 to pressurize it as well as provide pressure relief in the event that the container becomes over-pressured. The inlet valve 22 includes a base portion 94 having a flow passage 96 connecting its open ends 98 and 100 and a vent opening 102 connecting the flow passage to the atmosphere between said open ends. End 98 is externally threaded whereas end 100 is internally threaded. The flow passage 96 is narrowed adjacent the end 98 so as to provide a peripheral shoulder 104 therein. The end 98 is screwed into a threaded aperture 106 in the side wall 86 which communicates with the interior of the container 18.

The inlet valve 22 also includes a hollow, extensible portion 108 which is externally threaded at both of its ends 110 and 112 and is provided with an integral wrench fitting 114 between the ends 110 and 112. The end 110 of the extensible portion 108 is adapted to be screwed into the end 100 of the base portion 94. (A lock nut 116 is provided on the end 110 to prevent the extensible portion 108 from working loose from the base portion 94 once screwed together.) The end 112 of the extensible portion 108 is adapted for threaded fastening to a source of pressurized air such as a hand pump (not shown).

A conventional valve stem assembly, the movable rod member of which is shown at 118, is secured within the extensible portion 108 of the inlet valve 22. The valve stem assembly admits compressed air from a source into the extensible portion 108 and then into a rigid tube 120. The tube 120 is affixed to, and extends from, the end 110 of the extensible portion 108. The tube 120 terminates at a point inward of the peripheral shoulder 104 of the base portion 94.

A ring-shaped plug 122 having a rubber seal 124 is slidably positioned on the tube 120. The plug 122 and seal 124 are urged against the peripheral shoulder 104 by a compressed spring 126 which is also positioned on the tube 120. Thus, if the air pressure within the container 18 overcomes the compressive force of the spring 126, air within the container will escape past the seal 124, into the flow passage 96, from the vent opening 102 and into the atmosphere. The compressive force of the spring 126 may be adjusted somewhat by varying the depth that the end 110 of the extensible portion 108 is screwed into the open end 100.

The outlet valve 24 includes a hollow, base portion 128 which is preferably formed of plastic and is positioned within the cap 82. The enlarged front end 130 of the base portion 128 is partially located within an integral sleeve 132 which projects forwardly from the front wall 84 of the cap 82 and is secured in place by peripherally crimping the sleeve 132. The reduced rear end 134 of the base portion 128 extends away from the front wall 84 of the cap 82 toward the container body 76. A peripheral shoulder 136 connects the front end 130 and rear end 134 together.

The front and rear ends 130 and 134 of the base portion 128 are respectively provided with circular openings 138 and 140. From within the base portion 128, a sealing ball 142 is urged into the opening 138 by a compressed spring 144 extending from the shoulder 136. From the outside of the base portion 128, a discharge tube 146 is retained within the opening 138 by a movable but snug frictional engagement with the interior of the sleeve 132. Also, one end of a flexible conduit 148 is frictionally secured within the opening 140. The free end of the conduit 148 is located within the rear end of the container 18 and is provided with a hollow weight 150 for improved fluid pickup.

The discharge tube 146 conveys smoke-generating liquid out of the valve assembly 20 into a flexible conduit 152. The discharge tube 146 has slots as at 154 in its rear end to aid in admitting any smoke-generating liquid that flows past the ball 142 into the interior of the tube 146. The front end of the tube 146 is connected to the flexible conduit 152 which, in turn, is connected for flow to the muffler 154 of the engine 28. A peripheral flange 156 is firmly affixed to the exterior of the tube 146 between the ends thereof.

The leg 36 of the keel member 30 accommodates the discharge tube 146. An aperture 158, extending from the front end to the rear end of the leg 36, permits passage of the tube 146. Also, a cutout 160 is provided in the rear end of the leg 36 to accommodate the peripheral flange 156.

Within the cutout 160, a motion transfer arm 162 is slideably secured to the discharge tube 146 in front of the peripheral flange 156. The arm 162 terminates at an apertured, free end 164 located adjacent one side of the keel member 30. Rearward movement of the arm 162 is transferred to the peripheral flange 156 and hence to the ball 142 to release smoke-generating liquid from the container 18 into the discharge tube 146 via slots 154.

The free end 164 of the arm 162 is connected to the pivoting crank 166 of the servo 26 by a stiff wire pushrod 168. A set screw-retained collar 170 is provided on the rear end of the pushrod 168 to impart rearward motion to the arm 162.

A fairing 172 is secured to the forward portion 32 of the keel member 30 by a screw 174 to reduce drag at the front of the smoke generator 10. As shown, the fairing 172 covers the front end of the container 18, the valve assembly 20, the forward portion 32 of the keel member 30, the servo 26 and the apparatus connecting the servo to the valve assembly. An aperture 176 is provided in the fairing 172 for passage of the conduit 152.

Use of the smoke generator 10 is straightforward. The bracket 16 is first attached to the aircraft 14 by extending screws 60 through the tabs 58 and into the aircraft at a desired location. Next, the rearward portion 34 of the keel member 30 is inserted into the bracket 16 so that the slot 42 receives the rod 66 and the apertures 64 and 70 are aligned. The leg 72 of clip 74 is then pushed into the aligned apertures 64 and 70 to a point where a portion of the serpentine leg 73 of the clip "snaps" into the indention 40. With the clip 74 positioned as described, the cradle 12 (and container 18, valve assembly 20 and servo 26 carried thereby) is strongly attached to the aircraft 14. Subsequent detachment of the cradle 12 requires only that the clip 74 be disengaged from the bracket 16 and keel member 30 by a hobbyist.

The servo 26 is connected by means of electrical leads (not shown) to the receiver/controller and battery carried within the aircraft 14 for remote operation. Because remote or radio control systems are well-known, and form no part of the present invention, the details thereof are not shown in the accompanying drawings. Suffice it to say, though, upon receiving the appropriate radio signal transmitted by a hobbyist, the servo crank 166 will be rotated to move the pushrod 168. Rearward movement of the pushrod 168 ultimately drives the ball 142 from its seat within opening 138 to cause pressurized smoke-generating liquid in the container 18 to flow into the tube 146, conduit 152 and muffler 154. The hot exhaust gasses leaving the engine 28 through the muffler 154 cause the smoke-generating liquid to rapidly oxidize and produce a dense plume of smoke that can be used for skywriting purposes.

The supply of smoke-generating liquid within the container 18 can be replenished when emptied from use. To accomplish this, the emptied container 18 is rotated to disengage its threaded neck 78 from the cap 82. Next, the container 18 is pulled rearwardly through the ring member 44 of the cradle 12. Finally, the container 18 is filled to the desired level and screwed back onto cap 82.

After refilling the container 18 with smoke-generating liquid, it must be repressurized with air which serves as a propellant for the liquid. Air is supplied to the container 18 by connecting a source of pressurized air like a hand pump fitting to the threaded end 112 of the inlet valve 22. Once connected together, the rod member 118 of the valve stem assembly is shifted inwardly thus allowing air to flow from the hand pump, through the tube 120, and into the container 18. Disconnecting the source of pressurized air from the end 112, after repressurization is complete, permits the rod member to shift outwardly and seal the air within the container 18. Provided that the container 18 is not overpressured, the air within it can only escape through the outlet valve 24 after driving all smoke-generating liquid therefrom. It should be noted that the weighted, flexible conduit 148 within the container 18 permits the smoke generator 10 to deliver smoke-generating liquid to the muffler 154 while the aircraft 14 is level or inverted.

Due to the unique configuration of the cradle 12 and bracket 16, the smoke generator 10 is easily attached to radio controlled aircraft, large or small. The streamlined shape provided by the fairings 80 and 172 makes the smoke generator visually pleasing and unobtrusive. After use, the smoke generator 10 may be easily removed and attached to another aircraft having a bracket 16 by manipulating little more than a single clip 74.

While the invention has been described with a high degree of particularity, it will be appreciated by those skilled in the art that modifications may be made thereto. For example, the rod 66 can be integrally formed with bracket walls 56 so that collars 68 are not required for their attachment. Therefore, it is to be understood that the present invention is not limited to the sole embodiment described above, but encompasses any and all embodiments within the scope of the following claims.

I claim:

1. A smoke generator for radio controlled aircraft having an internal combustion engine, comprising:
   a bracket adapted for attachment to the radio controlled aircraft;
   a cradle releasably secured to said bracket;
   a container for holding a pressurized, smoke-generating liquid, said container being carried by said cradle;
   a conduit adapted to place said container in fluid communication with the internal combustion engine;
   a valve assembly in fluid communication with said container and having an outlet valve for regulating the flow of pressurized, smoke-generating liquid from said container into said conduit, said valve assembly being carried by said cradle; and,
   a servo having a crank for operating said outlet valve in response to radio signals received from a remote transmitter, said servo being carried by said cradle and said crank being mechanically linked to said outlet valve.

2. The smoke generator according to claim 1 wherein said valve assembly further includes an inlet valve for selectively admitting pressurized air from a remote source into said container to pressurize smoke-generating liquid therein.

3. The smoke generator according to claim 1 wherein:
   said bracket includes a pair of opposed side walls having first front ends and first rear ends, said first front ends having a pair of axially aligned first apertures and said first rear ends being connected by a rod; and,
   wherein said cradle includes a keel member having a portion adapted for positioning between said side walls, said portion having a second front end and a second rear end, said second front end having a second aperture adapted for axial alignment with said first apertures, said second rear end having a slot for receiving said rod therein; and,
   said smoke generator further comprises a retaining clip for partial insertion into said aligned first and second apertures.

4. The smoke generator according to claim 1 wherein said cradle further comprises:
   a keel member having diverging rearward and forward portions, said rearward portion being adapted for positioning within, and releasable attachment to, said bracket;
   a rearward ring member secured to said rearward portion for encircling said container; and,
   a forward ring member for encircling and securely grasping said valve assembly.

5. The smoke generator according to claim 4 wherein said forward portion of said keel member further includes a pair of downwardly extending legs for the attachment of said servo.

6. The smoke generator according to claim 1 further comprising a fairing covering said valve assembly and said servo.

7. A smoke generator for radio controlled aircraft having an internal combustion engine, comprising:
   a bracket for attachment to the radio controlled aircraft;
   a cradle releasably secured to said bracket;
   a valve assembly in fluid communication with said container and having an outlet valve for regulating the flow of pressurized, smoke-generating liquid therethrough, said valve assembly being secured to said cradle and having a threaded rear end;

a container for holding a pressurized, smoke-generating liquid, said container having a front end and a rear end and a threaded opening in threaded engagement with said threaded rear end of said valve assembly so as to place said container in fluid communication with said outlet valve;

a conduit placing said outlet valve in fluid communication with the internal combustion engine; and, a servo having a crank for operating said outlet valve in response to radio signals received from a remote transmitter, said servo being carried by said cradle and said crank being mechanically linked to said outlet valve.

8. The smoke generator according to claim 7 wherein said valve assembly further includes an inlet valve for selectively admitting pressurized air from a remote source into said container to pressurize smoke-generating liquid therein.

9. The smoke generator according to claim 7 wherein said cradle includes a pair of downwardly extending legs for the attachment of said servo.

10. The smoke generator according to claim 7 further comprising a first fairing secured to said cradle and covering: said front end of said container, said valve assembly and said servo.

11. The smoke generator according to claim 10 further comprising a second fairing covering the rear end of said container.

12. The smoke generator according to claim 7 wherein said bracket includes a pair of opposed side walls having first front ends and first rear ends, said first front ends having a pair of axially aligned first apertures and said first rear ends being connected by a rod; and, wherein said cradle includes a keel member having a portion adapted for positioning between said side walls, said portion having a second front end and a second rear end, said second front end having a second aperture adapted for axial alignment with said first apertures, said second rear end having a slot for receiving said slot therein; and, said smoke generator further comprises a retaining clip for partial insertion into said aligned first and second apertures.

13. The smoke generator according to claim 7 wherein said cradle further comprises:

a keel member having diverging rearward and forward portions, said rearward portion being adapted for positioning within, and releasable attachment to, said bracket;

a rearward ring member secured to said rearward portion for encircling said container; and, a forward ring member for encircling and securely grasping said valve assembly.

14. A smoke generator for radio controlled aircraft having an internal combustion engine, comprising:

a bracket for attachment to the radio controlled aircraft;

a cradle releasably secured to said bracket;

a container for holding a pressurized, smoke-generating liquid, said container having a front end and a rear end and a threaded opening in said front end;

a valve assembly secured to said cradle and in fluid communication with said container, said valve assembly including:

a hollow cap in threaded engagement with said threaded opening in said container, said hollow cap having an interior space in fluid communication with said container;

an outlet valve on said hollow cap and in fluid communication with said interior space for regulating the flow of pressurized, smoke-generating liquid therethrough, said outlet valve being adapted to be placed in fluid communication with the engine;

an inlet valve on said hollow cap and in fluid communication with said interior space for selectively admitting pressurized air from a remote source into said container to pressurize smoke-generating liquid therein; and, a servo having a crank for operating said outlet valve in response to radio signals received from a remote transmitter, said servo being carried by said cradle and said crank being mechanically linked to said outlet valve.

15. The smoke generator according to claim 14 wherein said outlet valve includes:

a hollow, base portion having an inlet opening in fluid communication with said container and an outlet opening in fluid communication with the engine;

a ball within said base portion and seated within said outlet opening;

a compressed spring within said base portion and engaged with said ball so as to urge said ball into said outlet opening;

a discharge tube having an inlet end and an opposed, outlet end, said inlet end being inserted into said base portion through said outlet opening so as to engage said ball, said outlet end being adapted to be placed in fluid communication with said engine; and, said discharge tube being movable by said crank so that motion of said inlet end into said outlet opening unseats said ball so as to permit pressurized, smoke-producing liquid to flow from said container into said discharge tube.

16. The smoke generator according to claim 14 wherein said cradle further includes a pair of integral, downwardly extending legs for the attachment of said servo.

17. The smoke generator according to claim 14 further comprising a first fairing secured to said cradle and covering: said front end of said container, said valve assembly and said servo.

18. The smoke generator according to claim 17 further comprising a second fairing covering the rear end of said container.

19. The smoke generator according to claim 14 wherein said bracket includes a pair of opposed side walls having first front ends and first rear ends, said first front ends having a pair of axially aligned first apertures and said first rear ends being connected by a rod; and, wherein said cradle includes a keel member having a portion adapted for positioning between said side walls, said portion having a second front end and a second rear end, said second front end having a second aperture adapted for axial alignment with said first apertures, said second rear end having a slot for receiving said rod therein; and, said smoke generator further comprises a retaining clip for partial insertion into said aligned first and second apertures.

20. The smoke generator according to claim 14 wherein said cradle further comprises:

a keel member having diverging rearward and forward portions, said rearward portion being adapted for positioning within, and releasable attachment to, said bracket;

a rearward ring member secured to said rearward portion for encircling said container; and, a forward ring for encircling and securely grasping said valve assembly.

* * * * *